UNITED STATES PATENT OFFICE.

JOHN E. SIEBEL, OF CHICAGO, ILLINOIS.

IMPROVEMENT IN FERMENTATION AND DISTILLATION.

Specification forming part of Letters Patent No. 133,677, dated December 3, 1872.

*To all whom it may concern:*

Be it known that I, JOHN E. SIEBEL, of Chicago, county of Cook, State of Illinois, have invented new and useful Improvements in Fermentation and Distillation, of which the following is a specification:

The first part of my invention consists in replacing the whole or part of the small grain—rye, oats, or barley—which are used in mashing corn by blood in a fresh or putrefied state. The blood is added to the mash in the proportion of one pint to the bushel of corn, more or less, according to requirements; then the process of mashing and fermenting is carried on as usual. As the small grain contains more albuminous matter than corn they are added to the mash for the propagation of yeast; but as blood is almost all albuminous matter it is well fitted to take the place of the small grain, and the more so as it can be obtained at little cost. The mash prepared with blood and fermented may be distilled as usual; but the distillate is contaminated with other substances formed by the fermentation with blood, so that it would not be adapted for the manufacture of liquors; nevertheless this process is highly recommendable for the production of a substance to be used for manufacturing purposes.

The second part of my invention consists in the manufacture of aldehyde by continuous distillation, and the use of the same in the manufacture of acetic acid. The aldehyde is prepared by passing the vapors of fermented mash, before they enter the worm, through an iron pipe, part of which is heated to dull redness. The fermented mash, as prepared by the first part of my invention, is well adapted for this purpose, but any other fermented mash may be used instead. The aldehyde (formula, $C_4H_4O_2$) thus obtained is mixed with small quantities of other substances. It may be converted into diluted acetic acid in the usual manner by passing it through the stands, but a stronger product can be obtained in a shorter time than is possible with the materials used at present for this purpose.

What I claim is—

1. Mashing and fermenting with the specified material.

2. The preparation of aldehyde and its use for the manufacture of acetic acid, as set forth.

JOHN E. SIEBEL.

Witnesses:
CHAS. J. WALSER,
CHARLES PROEBSTING.